United States Patent
Henningson et al.

(10) Patent No.: US 10,065,521 B2
(45) Date of Patent: Sep. 4, 2018

(54) SYSTEM AND METHOD FOR USING SOLAR POWER TO SUPPLEMENT POWER IN A DC ELECTRICAL SYSTEM

(71) Applicant: Purkey's Fleet Electric, Inc., Lowell, AR (US)

(72) Inventors: Dale B. Henningson, Manti, UT (US); Bruce A. Purkey, Lowell, AR (US)

(73) Assignee: Purkey's Fleet Electric, Inc., Lowell, AR (US)

( * ) Notice: Subject to any disclaimer, the term of this patent is extended or adjusted under 35 U.S.C. 154(b) by 152 days.

(21) Appl. No.: 15/191,188

(22) Filed: Jun. 23, 2016

(65) Prior Publication Data
US 2016/0380473 A1 Dec. 29, 2016

Related U.S. Application Data

(60) Provisional application No. 62/183,604, filed on Jun. 23, 2015, provisional application No. 62/196,132, filed on Jul. 23, 2015.

(51) Int. Cl.
| | |
|---|---|
| H01M 10/44 | (2006.01) |
| H01M 10/46 | (2006.01) |
| B60L 11/18 | (2006.01) |
| H02J 7/35 | (2006.01) |
| B60R 16/033 | (2006.01) |
| B60K 16/00 | (2006.01) |

(52) U.S. Cl.
CPC ......... *B60L 11/1848* (2013.01); *B60K 16/00* (2013.01); *B60L 11/1811* (2013.01); *H02J 7/35* (2013.01); *B60K 2016/003* (2013.01); *B60R 16/033* (2013.01)

(58) Field of Classification Search
CPC .. H02J 7/02; H02J 7/04; H02J 2007/10; H02J 2007/105; H02J 7/35
USPC ............... 320/101, 104, 109, 138, 140, 141; 136/291–293
See application file for complete search history.

(56) References Cited

U.S. PATENT DOCUMENTS

| | | | |
|---|---|---|---|
| 2007/0023078 A1* | 2/2007 | Palladino | H01L 31/042 136/244 |
| 2014/0095018 A1* | 4/2014 | Atluri | B60L 1/00 701/36 |

* cited by examiner

*Primary Examiner* — Edward Tso
(74) *Attorney, Agent, or Firm* — Gurr & Brande, PLLC; Robert A. Gurr

(57) ABSTRACT

In one method of using solar power as a supplemental power source in a DC system of a vehicle, the voltage of a vehicle battery is measured to determine if an alternator is operating. Upon determining that the alternator is running, a solar charge controller sets the voltage set-point to be about 0.1 Volts higher than the voltage produced by the alternator. This allows the solar panel to contribute up to the full power capability of the solar panel to the DC power system, even though the battery may be fully charged, which reduces the load on the alternator, thereby improving fuel economy.

11 Claims, 4 Drawing Sheets

SYSTEM AND METHOD FOR USING SOLAR POWER TO SUPPLEMENT POWER IN A DC ELECTRICAL SYSTEM

CROSS-REFERENCE TO RELATED APPLICATIONS

This application claims the benefit of U.S. Provisional Application Ser. No. 62/183,604, filed on Jun. 23, 2015, and U.S. Provisional Application Ser. No. 62/196,132, filed on Jul. 23, 2015, both of which are incorporated herein by reference.

TECHNICAL FIELD

The present disclosure relates to methods and systems for using solar power. More specifically, the present disclosure relates to using solar power to supplement a DC electrical system of a vehicle.

BACKGROUND

In the automobile and trucking industries, it can sometimes be necessary or desirable to add a supplemental power source to a DC electrical system. In the trucking industry, for example, a solar charging system is sometimes added to the electrical system on the truck or on the trailer to counteract paralytic loads and/or to assist the charging of the battery. These solar systems typically include a solar panel and a solar charge controller connected to the battery. Various types of solar charge controllers are available that have been designed to provide multiple stage charging of the battery and, in some cases, maximize the power from the solar panel by controlling the voltage and current of the solar panel with the important objective of charging, but not overcharging, the battery. When these solar charge controllers operate in conjunction with the charging system on the vehicle (e.g., the alternator), the higher system voltage generated by the alternator can be interpreted by the solar charge controllers as a sign that the battery is fully charged, thereby triggering the solar charge controller to go to what is termed "stage 3" or "float mode." In float mode, the voltage set-point of the solar charge controller is reduced to prevent over-charging of the battery. Because the voltage set-point is reduced and is lower than the voltage of the alternator, the solar system no longer contributes power to the system.

A similar situation is encountered when a solar charging system is added to a liftgate charging system that utilizes a DC-DC converter to charge an auxiliary battery. The alternator provides power to the DC-DC converter through long wires, and the DC-DC converter, in order to overcome the voltage drops in the long wires, steps up the voltage to more effectively charge the axillary battery. When the liftgate charging system is active, the solar charge controller can go to float mode and cease contributing power to the system, thereby leaving the alternator to generate the energy. The designs for solar controllers typically set the charging set-points for the voltage based on the stage of charging. For a three-stage solar charger, the first stage is a bulk charge stage where the solar charge controller directs the full charge capability of the solar panel to the battery until the battery voltage reaches a first set-point, typically around 14.7 Volts. In the second stage, or the top-off stage, the solar charge controller keeps the voltage at that point by reducing the current by utilizing pulse width modulation, or some other technique, until the current requirement reduces to a predetermined level, indicating that the battery is fully-charged. In stage three, float mode or maintenance mode, the charge controller reduces the voltage set-point to a value typically around 13.0 Volts with the objective of maintaining the charge on the battery.

In a typical electrical system of a vehicle, the electrical power is generated by the alternator. The alternator essentially converts mechanical energy to electrical energy. The engine rotates the alternator; the higher amount of power that the alternator generates, the more mechanical load the alternator puts on the engine. Studies show how much additional fuel is used by the engine to generate electrical power. See the white paper "Improving Alternator Efficiency Measurably Reduces Fuel Cost" by Mike Bradfield of Remy, Inc. This study shows how much fuel is used by the engine to produce mechanical energy, based on the efficiency of the engine, to produce power from chemical energy and the efficiency of the alternator to produce electrical energy from that mechanical energy. With an overall efficiency of 21% and a diesel fuel cost of $4/gal, the referenced white paper shows that the cost to generate electrical energy is about $0.51/kWh. This is many times higher than the typical residential utility rate.

The typical "key on" load of a class 8 truck, after the batteries are fully-charged, is about 280 Watts (20 Amps at 14 Volts). A 300 Watt solar panel could produce up to about 2 kWHr of electrical energy in a day. In the prior art, when the batteries are fully-charged, or if the solar charge controller goes into float mode, the solar energy is not captured.

Therefore, there is a need to reduce the cost of generating electrical energy in a vehicle.

SUMMARY OF EXAMPLE EMBODIMENTS

In one embodiment, a method of using solar power as a supplemental power source in a DC system of a vehicle comprises determining whether a DC charging system of the vehicle is operating, and, upon determining that the DC charging system is operating, setting a set-point of a solar charge controller to be higher than a regulation voltage of the DC charging system.

In one embodiment, a method of using solar power as a supplemental power source in a DC system comprises measuring the voltage of a DC power system to determine if an alternator is operating and using a solar charge controller to set the voltage point of a solar charging system to be about 0.1 Volts higher than the alternator. This configuration allows the solar panel to contribute more power to the DC power system, which reduces the load on the alternator and improves fuel economy.

A method of using solar power as a supplemental power source in a DC system of a vehicle, comprising monitoring the voltage of a vehicle battery using a solar charge controller; determining that an alternator is running when the voltage of the battery meets or exceeds about 13.6 Volts; upon determining that the alternator is running, setting the set-point of the solar charge controller to be about 0.1 Volts higher than the alternator's regulation voltage; and when the set-point is higher than the alternator's regulation voltage, one or more solar panels contributing power to the DC system, reducing the load on the alternator.

A solar charge controller on a vehicle, comprising at least one analog condition circuit for receiving voltage input from a solar panel on a vehicle and from a vehicle battery, one or more voltage dividing resistors for reducing said voltages to within the range of an analog to digital converter, and a microcontroller configured to send a signal to a transistor to turn the transistor's terminals "on" when the voltage received from a vehicle battery meets or exceeds a preconfigured threshold, indicating the an alternator is operating; wherein when the transistor's terminals are "on," current flows from the solar panel to the vehicle battery.

DETAILED DESCRIPTION OF EXAMPLE EMBODIMENTS

Figure 1:
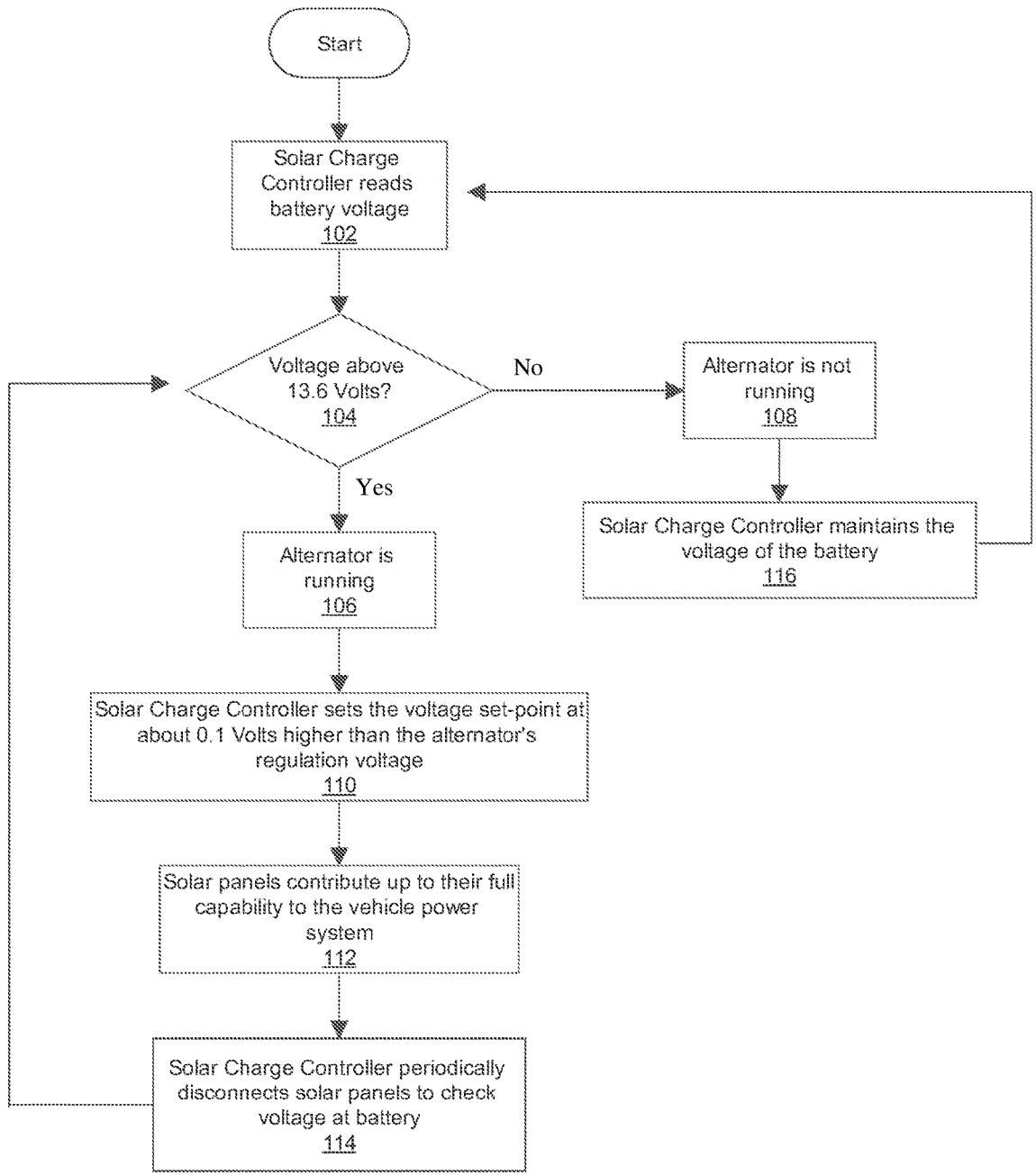
FIG. 1 is a flowchart for the algorithm for the solar charge controller to select and utilize three-stage charging and a fixed-voltage about 0.1 Volts higher than the alternator's regulation voltage.

The following descriptions depict only example embodiments and are not to be considered limiting in scope. Any reference herein to "the invention" is not intended to restrict or limit the invention to exact features or steps of any one or more of the exemplary embodiments disclosed in the present specification. References to "one embodiment," "an embodiment," "various embodiments," and the like, may indicate that the embodiment(s) so described may include a particular feature, structure, or characteristic, but not every embodiment necessarily includes the particular feature, structure, or characteristic. Further, repeated use of the phrase "in one embodiment," or "in an embodiment," does not necessarily refer to the same embodiment, although it may.

Reference to any included drawings is done throughout the disclosure using various numbers. The numbers used are for the convenience of the drafter only, and the absence of numbers in an apparent sequence should not be considered limiting and does not imply that additional parts of that particular embodiment exist. Numbering patterns from one embodiment to another need not imply that each embodiment has similar parts, although it may.

Accordingly, the particular arrangements disclosed are meant to be illustrative only and not limiting as to the scope of the invention, which is to be given the full breadth of the appended claims and any and all equivalents thereof. Although specific terms are employed herein, they are used in a generic and descriptive sense only and not for purposes of limitation. Unless otherwise expressly defined herein, such terms are intended to be given their broad, ordinary, and customary meaning not inconsistent with that applicable in the relevant industry and without restriction to any specific embodiment hereinafter described. As used herein, the article "a" is intended to include one or more items. When used herein to join a list of items, the term "or" denotes at least one of the items, but does not exclude a plurality of items of the list. For exemplary methods or processes, the sequence and/or arrangement of steps described herein are illustrative and not restrictive.

It should be understood that the steps of any such processes or methods are not limited to being carried out in any particular sequence, arrangement, or with any particular graphics or interface. Indeed, the steps of the disclosed processes or methods generally may be carried out in various different sequences and arrangements while still falling within the scope of the present invention.

The term "coupled" may mean that two or more elements are in direct physical or electrical contact. However, "coupled" may also mean that two or more elements are not in direct contact with each other, but yet still cooperate or interact with each other.

The terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.).

The term "vehicle battery" may refer to one or more batteries on a vehicle, such as a crank battery, hotel battery, liftgate battery, or other battery.

As briefly discussed above in the Background section, the designs for solar controllers typically set the charging set-points for the voltage based on the stage of charging. For a three-stage solar charger, these stages are typically a bulk stage, a top-off stage, and a float mode. If the only objective of the solar system is to charge the battery, then there is no problem with this method; however, if one of the objectives is to reduce the power demands on the alternator in order to save fuel, then the solar system going into float mode when the alternator is running would not be desirable. This is because when the solar system goes into float mode, it is no longer supplementing power to the system, and, therefore, all of the electrical power must be generated by the alternator. When the alternator is producing power, it puts a mechanical load on the engine, which in turn reduces the fuel efficiency of the vehicle. The present disclosure provides a solution to this situation by detecting when the vehicle's charging system is operating and adjusting the set-point of the solar charge controller so that the solar panels continue to deliver power to the system when the alternator is running, thereby reducing the electrical demand on the alternator. After a solar system is installed, the ongoing energy produced is free. The present disclosure allows more of that energy to be captured by directing the energy to the vehicle's electrical system when the vehicle is running, thereby reducing the load on the vehicle's alternator.

In one embodiment, as shown in FIG. 1, a method 100 of using solar power as a supplemental power source in a DC system comprises measuring the voltage of a DC power system to determine if the alternator is operating. This is accomplished using a solar charge controller that monitors and periodically reads the voltage of a vehicle battery. For example, the solar charge controller monitors the voltage of the battery (e.g., crank battery) when in float mode and, using technology known in the art, such as pulse width modulation (PWM), keeps the battery from overcharging. When the solar charge controller receives a signal greater than about 13.6 Volts, such a signal indicates that the alternator is operating and supplying power to the battery. Once the alternator is operating, the solar charge controller periodically checks the voltage at the battery to determine whether the alternator is still operating or not. In one non-limiting example, the solar charge controller electrically disconnects the solar panels from the battery every two minutes to check the voltage of the battery. However, it will be appreciated that various lengths of time may be used, such that the battery is not drained of energy and that the solar panels are on for a sufficient amount of time to contribute power to the system. If the alternator is still operating, the solar charge controller will continue to use the energy from the solar panels to reduce the energy consumption load on the alternator. If the alternator is no longer operating (measured by a voltage reading of less than about 13.6 Volts), the solar charge controller will change to float mode and use the energy from the solar panels to charge and maintain the batteries on the vehicle.

Referring back to FIG. 1, in step 102, a solar charge controller reads the voltage of the battery (e.g., a crank battery or an auxiliary battery). In step 104, if the voltage is above about 13.6 Volts, the solar charge controller determines, in step 106, that the alternator is running; if the voltage is below 13.6 Volts (the "threshold" voltage) in step 104, the solar charge controller determines, in step 108, that the alternator is not running. Other voltages may be used as the threshold voltage, such as, as low as about 13.2 Volts and as high as about 13.8 Volts; however, 13.6 is preferable. (If the alternator is running, instead of using a typical three-stage charge algorithm, the solar charge controller, in step 110, sets the voltage set-point to be about 0.1 Volts higher than the alternator's regulation voltage. It is worth noting that while 0.1 Volts is mentioned herein, variations to that voltage would still allow the system to function. In other words, the set-point may be 0.1 Volts higher, 0.2 Volts higher, 0.3 Volts higher, etc. In step 112, with the set-point higher, the solar panels contribute up to their full power capability to the DC power system, which reduces the load on the alternator and thereby improves fuel economy. In step 114, the solar charge controller periodically disconnects the solar panels from the battery to check the voltage of the battery, which is then measured in step 104, continuing the cycle. Ideally, the solar charge controller would have at least a few second delay before reading the voltage of the battery once the solar panels have been disconnected. If the alternator is not running, then the charge controller, in step 116, maintains the voltage of the battery, such as by utilizing a three-stage charging algorithm to fully charge, but not overcharge, the battery. It will be appreciated that a three-stage charging algorithm is not required, and that other methods of maintaining charge may also be used. Further, while reading the voltage of a vehicle battery can be used to determine whether an alternator is operating, other methods may also be used. For example, a solar charge controller could monitor the R-terminal, W-terminal, lamp voltage, or other signal that indicates that the alternator is active. Another method of determining whether the DC charging system of a vehicle is operating would be to monitor a DC-DC converter. In other words, some DC-DC converters have an ignition input signal that turns the converter on/off. When the ignition is on, the DC-DC converter is active. Monitoring the DC-DC converter would therefore also be an acceptable method for determining when to adjust the set-point of the solar charge controller.

Figure 2:
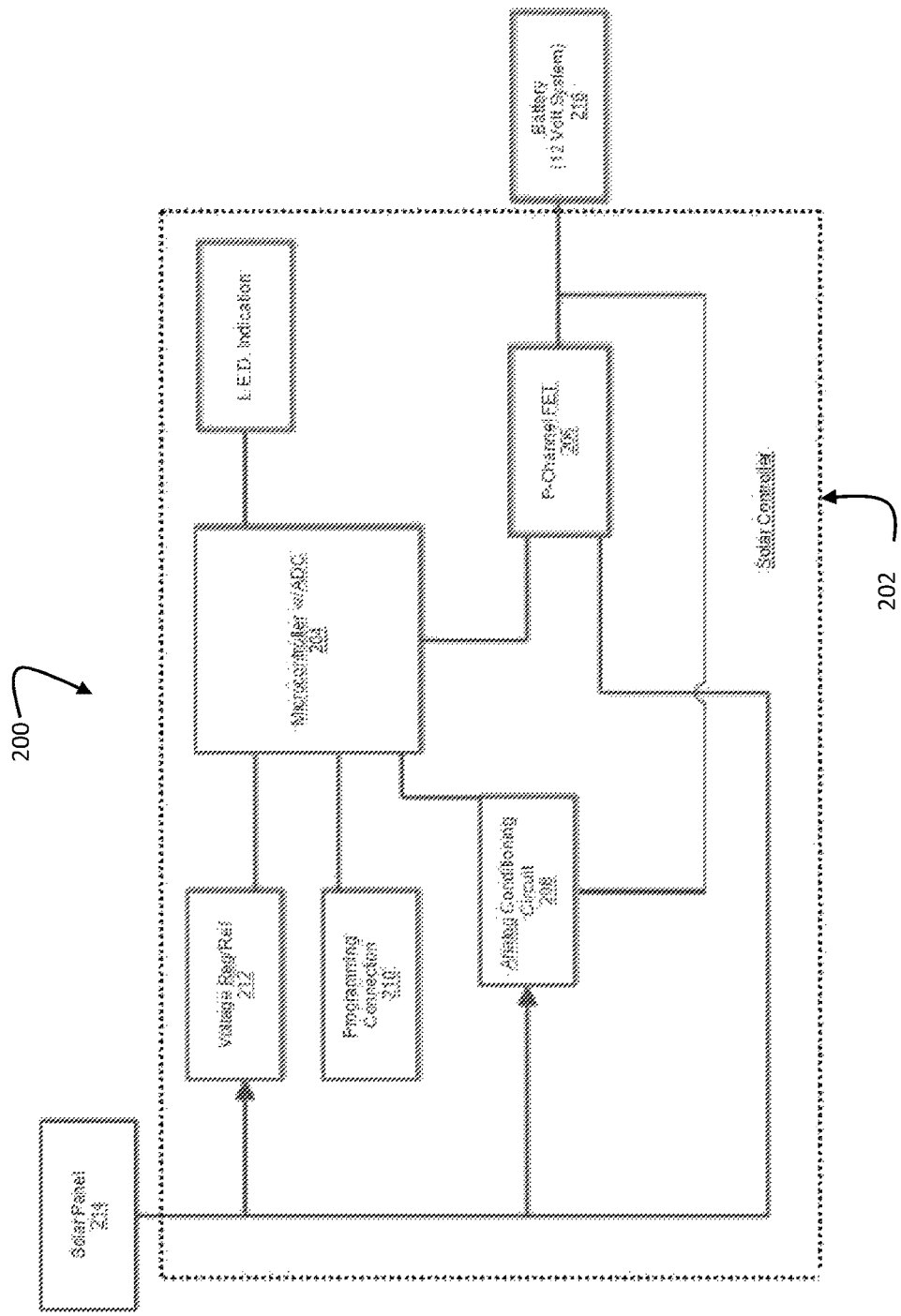
FIG. 2 is a block diagram of the solar charge controller for using solar power to supplement a DC power system.

FIG. 2 illustrates a block diagram 200 for using solar power to supplement a DC power system in a vehicle. As shown, a solar charge controller 202 comprises a microcontroller 204 that further comprises an analog to digital converter (ADC), a transistor 206 (e.g., a P-channel MOSFET), one or more analog conditioning circuits 208, a programming connection 210, and a voltage regulator 212 which also serves as the voltage reference for the ADC of the microcontroller 204. As shown, the solar charge controller 202 couples the one or more solar panels 214 to the vehicle power system 216 (e.g., crank battery). In one embodiment, the one or more analog conditioning circuits 208 receive voltage input from the solar panel 214 and the voltage of the battery 216. The voltages are then reduced to be within the range of the ADC within the microcontroller using voltage dividing resistors which are common in the art. The one or more analog conditioning circuits 208 may comprise filter capacitors that reduce the electrical noise on the analog signals. The transistor 206 receives a PWM signal from the microcontroller 204. When a first terminal of the transistor receives a signal from the microcontroller, the first terminal turns "on" which turns a second terminal "on" by pulling the gate of the second terminal low. When the second terminal is "on," the output of the solar panel 214 is coupled to the battery 216 on the vehicle, thus allowing current to flow from the solar panel 214 to the battery 216 on the vehicle. Other components may be added to the transistor 206, such as a diode that will suppress negative transients, a resettable fuse that will protect the second terminal and diode in the event of a reverse connection, and a surge absorber that protects the solar charge controller 202 electronics from transient voltage spikes on the vehicle's electrical system.

It will be appreciated that while PWM is referenced above, similar technologies may be used to achieve the same result, such as a system configured to use Maximum Power Point Tracking (MPPT).

Figure 3:
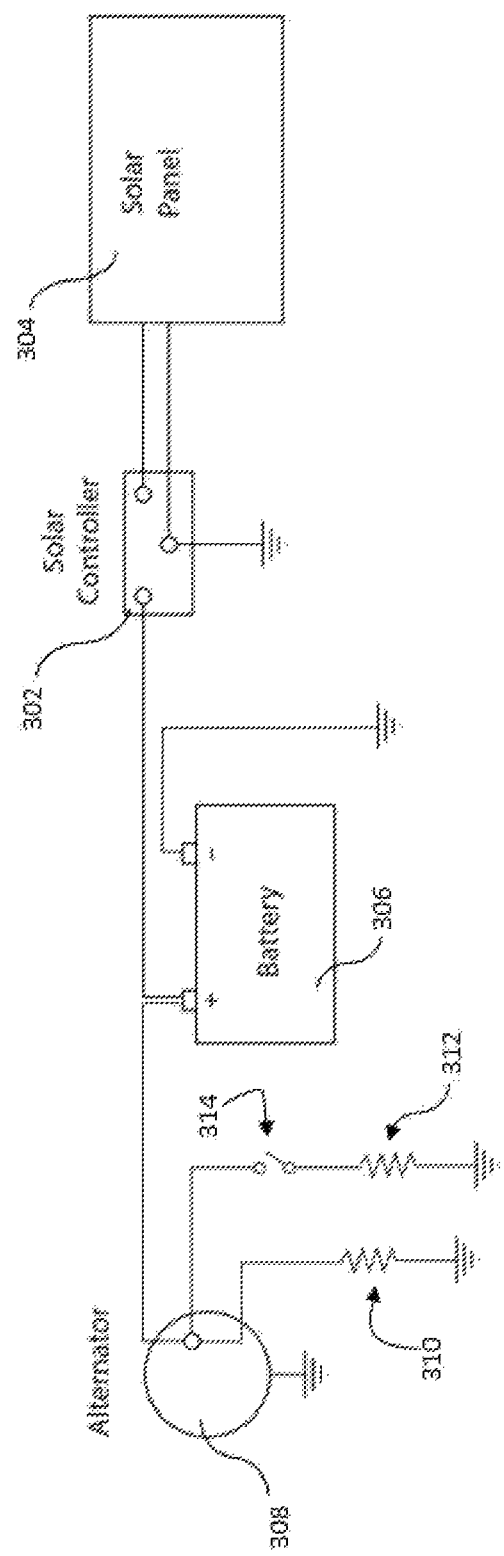
FIG. 3 is a schematic for using solar power to supplement a DC power system.

In one embodiment, as generally illustrated in FIG. 3, a system 300 for using solar power as a supplemental power source in a DC system comprises a solar charge controller 302 coupled to at least one solar panel 304, a battery 306 (e.g., crank battery) coupled to an alternator 308; in one embodiment, the solar charge controller 302 comprises an analog to digital converter (ADC), a transistor capable of accepting pulse width modulation control, and a microcontroller capable of producing a pulse width modulated signal. The microcontroller periodically switches off the solar power by turning off the transistor, and, with the transistor off, measures the voltage at the battery 306. If the voltage of the battery 306 is above a predetermined value (e.g., 13.6 Volts), then the solar charge controller 302 concludes (e.g., by using the microcontroller with logic) that the alternator 308 is supplying power to the DC system and uses a voltage set-point about 0.1 Volts higher than the measured voltage so that the solar panel 304 can contribute as much power as possible to the DC system. By so doing, it reduces the load on the alternator 308, which thereby reduces the load on the engine, improving fuel economy. The solar charge controller 302 may comprise an analog to digital converter, a transistor with PWM control or some other method such as MPPT control, and a microcontroller. A resistor 310 represents fixed loads on the vehicle's electrical system. Resistor 312 and switch 314 represent switched loads on the vehicle's electrical system. In one embodiment, a system may further comprise a method of indicating power status (e.g., low voltage, good voltage, charging, not charging, etc.) of a primary (e.g., crank battery) and/or secondary power source (e.g., liftgate battery). This may be accomplished using a variety of user interfaces, such as LCD screens, one or more LEDs, or similar.

Figure 4:
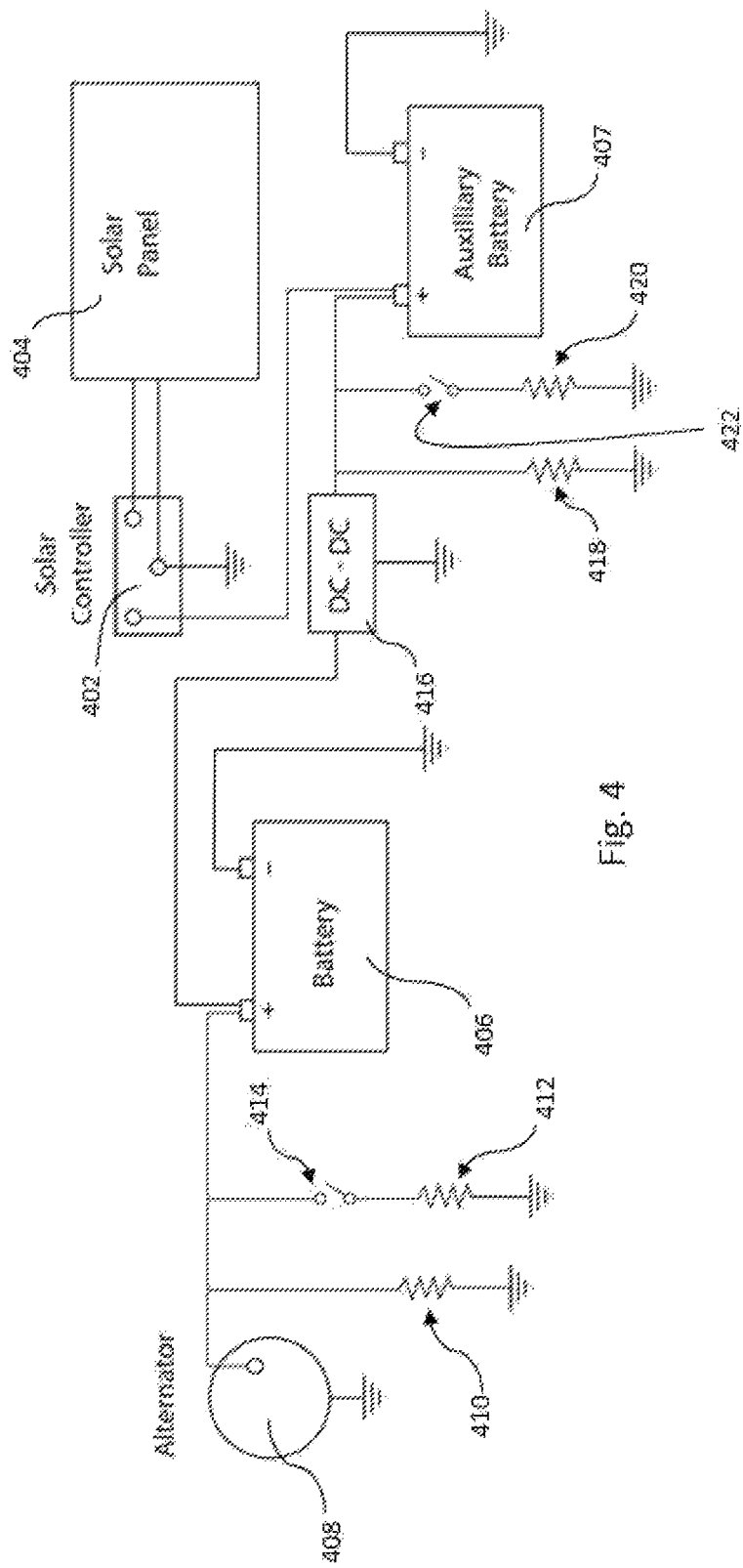
FIG. 4 is a schematic of a system for using solar power to supplement a DC power system having an auxiliary battery.

In another embodiment, as generally illustrated in FIG. 4, in a DC system utilizing one or more auxiliary batteries, a system for using solar power comprises a solar charge controller 402 coupled to one or more solar panels 404, a main/primary battery 406 (e.g., crank battery) and at least one auxiliary battery 407 (e.g., liftgate battery). The solar charge controller 402 monitors the status of the auxiliary battery 407 to determine if the primary source, typically the main battery 406 connected to an alternator 408, is contributing power to the DC system. This is done by the solar charge controller 402 periodically terminating the power from the solar panel 404 and measuring the voltage of the auxiliary battery 407. If the voltage is above a predetermined value (e.g., 13.6 Volts), then the solar charge controller 402 concludes that a DC-DC converter 416 is supplying power to the system and uses a voltage set point about 0.1 Volts higher than the measured voltage so that the solar panel 404 can contribute up to its full power capability to the DC system. By using the solar panel 404 to contribute power to the system, this configuration reduces the load on the DC-DC converter 416, thereby reducing the load on the alternator 408, which thereby reduces the load on the engine, improving fuel economy. The resistor 410 represents fixed loads on the vehicle's electrical system. The resistor 412 and switch 414 represent switched loads on the vehicle's electrical system. Resistor 418 represents fixed loads on the vehicle's auxiliary electrical system. And resistor 420 and switch 422 represent switched loads on the auxiliary electrical system.

Exemplary embodiments are described above. No element, act, or instruction used in this description should be construed as important, necessary, critical, or essential unless explicitly described as such. Although only a few of the exemplary embodiments have been described in detail herein, those skilled in the art will readily appreciate that many modifications are possible in these exemplary embodiments without materially departing from the novel teachings and advantages herein. Accordingly, all such modifications are intended to be included within the scope of this invention as defined in the appended claims. Additionally, it is not intended that the scope of patent protection afforded the present invention be defined by reading into any claim a limitation found herein that does not explicitly appear in the claim itself.

What is claimed is:

1. A method of using solar power as a supplemental power source in a DC system of a vehicle, comprising:
    determining whether a DC charging system of the vehicle is operating;
    in response to determining that the DC charging system of the vehicle is operating, setting a set-point of a solar charge controller to be higher than the regulation voltage of the DC charging system of the vehicle.

2. The method of claim 1, wherein in response to the set-point being set higher than the regulation voltage of the DC charging system of the vehicle, one or more solar panels contributing power to the DC system of the vehicle.

3. The method of claim 1, wherein while the set-point of the solar charge controller is set higher than the regulation voltage of the DC charging system of the vehicle, periodically terminating the input to the DC system of the vehicle from the solar panels and reading the voltage of the DC system of the vehicle.

4. The method of claim 1, wherein determining whether a DC charging system of a vehicle is operating comprises the steps of:
    using a solar charge controller to read the voltage of the DC charging system of the vehicle.

5. The method of claim 1, wherein determining whether a DC charging system of a vehicle is operating comprises the steps of:
    using a solar charge controller to monitor at least one of an R-terminal and W-terminal of an alternator.

6. The method of claim 1, wherein determining whether a DC charging system is operating comprises the steps of:
    using a solar charge controller to monitor the operating status of a DC-DC converter.

7. A method of using solar power as a supplemental power source in a DC system of a vehicle, comprising:
    monitoring the voltage of a DC system of a vehicle using a solar charge controller;
    the solar charge controller determining that a DC charging system of a vehicle is operating when the voltage of the DC system of the vehicle meets or exceeds about 13.6 Volts;
    in response to determining that the DC charging system of the vehicle is operating, setting the set-point of the solar charge controller to be about 0.1 Volts higher than the regulation voltage of the DC charging system of the vehicle; and
    in response to setting the set-point higher than the regulation voltage of the DC charging system of the vehicle, one or more solar panels contributing power to the DC system of the vehicle.

8. The method of claim 7, further comprising while the set-point of the solar charge controller is set higher than the regulation voltage of the DC charging system of the vehicle, the solar charge controller periodically terminating the input to the DC system of the vehicle from the solar panels and reading the voltage of the DC system of the vehicle.

9. A solar charge controller on a vehicle, comprising:
    at least one analog conditioning circuit for receiving voltage input from a DC system of a vehicle;
    one or more voltage dividing resistors for reducing said voltage to within the range of a microcontroller coupled to an analog to digital converter; and
    the microcontroller configured to send a signal to a transistor to turn the transistor's terminals "on" when the voltage received from the DC system of a vehicle meets or exceeds a preconfigured threshold, indicating that a DC charging system of the vehicle is operating, wherein the solar charge controller is configured such that when the transistor's terminals are "on," the solar charge controller facilitates flow of current from the solar panel to the DC system of the vehicle.

10. The solar charge controller of claim 9, wherein the signal sent from the microcontroller is pulse width modulation.

11. The solar charge controller of claim 9, wherein the analog conditioning circuit further comprises filter capacitors that reduce the electrical noise on analog signals.

* * * * *